United States Patent
Huntley et al.

(10) Patent No.: US 10,631,525 B1
(45) Date of Patent: Apr. 28, 2020

(54) MULTI-PATH AQUARIUM FILTRATION APPARATUS

(71) Applicant: NEW PCA, LLC, Jacksonville, FL (US)

(72) Inventors: L. Ward Huntley, Orange Park, FL (US); Jeffrey R. Brudos, Jacksonville, FL (US); Nick Lari, Jacksonville, FL (US)

( * ) Notice: Subject to any disclaimer, the term of this patent is extended or adjusted under 35 U.S.C. 154(b) by 0 days.

(21) Appl. No.: 15/973,529

(22) Filed: May 7, 2018

Related U.S. Application Data (63) Continuation-in-part of application No. 15/889,167, filed on Feb. 5, 2018, now abandoned, which is a continuation-in-part of application No. 15/152,013, filed on May 11, 2016, now Pat. No. 9,883,661.

(60) Provisional application No. 62/159,498, filed on May 11, 2015.

(51) Int. Cl.
| | | |
|---|---|---|
| *A01K 63/04* | (2006.01) | |
| *A01K 63/00* | (2017.01) | |
| *C02F 1/00* | (2006.01) | |
| *C02F 1/28* | (2006.01) | |
| *C02F 101/16* | (2006.01) | |
| *C02F 101/10* | (2006.01) | |
| *C02F 103/20* | (2006.01) | |
| *C02F 101/38* | (2006.01) | |

(52) U.S. Cl.
CPC .......... *A01K 63/045* (2013.01); *A01K 63/006* (2013.01); *C02F 1/001* (2013.01); *C02F 1/28* (2013.01); *C02F 2101/105* (2013.01); *C02F 2101/16* (2013.01); *C02F 2101/38* (2013.01); *C02F 2103/20* (2013.01); *C02F 2301/046* (2013.01)

(58) Field of Classification Search
CPC ..... A01K 63/045; A01K 63/006; C02F 1/001; C02F 1/28; C02F 2101/105; C02F 2103/20; C02F 2101/38; C02F 2301/046; C02F 2101/16
USPC ............... 210/167.2, 167.22, 167.25, 167.27
See application file for complete search history.

(56) References Cited

U.S. PATENT DOCUMENTS

| | | | |
|---|---|---|---|
| 4,687,575 A | 8/1987 | Grose | |
| 5,006,230 A | 4/1991 | Votava, III et al. | |
| 5,084,164 A | 1/1992 | Del Rosario | |
| 5,474,673 A | 12/1995 | Ludlow | |
| 6,641,718 B2 | 11/2003 | Lari et al. | |
| 2003/0106859 A1 * | 6/2003 | Miyata | B01D 24/005 210/793 |
| 2007/0193956 A1 | 8/2007 | Nelson | |
| 2015/0129473 A1 * | 5/2015 | Kent | E03F 5/14 210/170.03 |

* cited by examiner

*Primary Examiner* — Fred Prince
(74) *Attorney, Agent, or Firm* — Mark Young PA (57) ABSTRACT

A multi-path aquarium filtration system has multiple chambers adapted to receive different types of treatment systems, and has a bypass gate assembly and at least one alternative flow path. By adjusting the bypass gate assembly volumetric flow rate between certain chambers is managed.

20 Claims, 8 Drawing Sheets

MULTI-PATH AQUARIUM FILTRATION APPARATUS

RELATED APPLICATION

This application is a continuation-in-part and claims the benefit of priority of U.S. Nonprovisional application Ser. No. 15/889,167 filed 5 Feb. 2018, which is a continuation-in-part and claims the benefit of priority of U.S. Nonprovisional application Ser. No. 15/152,013 filed 11-May-2016, now patented as U.S. Pat. No. 9,883,661, which is a non-provisional of and claims the benefit of priority of U.S. Provisional Application No. 62/159,498 filed 11 May 2015, the entire contents of which are incorporated herein by this reference and made a part hereof.

FIELD OF THE INVENTION

This invention relates generally to the field of aquarium filters, and more particularly to the field of external filter apparatuses for aquariums, wherein water to be treated is removed from the aquarium, treated by the filtration apparatus, and returned to the aquarium.

BACKGROUND

Maintaining a live animal or plant aquarium usually requires treatment of the water in order to optimize living conditions. For example, the water may need aeration, removal of protein, ammonia, phosphate and other undesirable compositions, eradication of algae and bacteria, etc. To accomplish this, aquarium filter apparatuses are utilized. Some filter apparatuses are positioned within the tank while others are external to the tank. Some filter apparatuses are simple systems, while others are more complicated, depending on the number and type of treatment systems that are required to sustain the tank. Different combinations of treatment systems are required for different aquatic environments.

Because the treatment requirements vary, it is an object of this invention to provide a filter apparatus that is able to accommodate multiple and differing treatment systems within a single external housing, and to provide such an apparatus that is structured to provide alternative and adjustable water flow paths. It is a further object to provide such an apparatus that is modular in structure such that the unit may be separated for insertion into or removal from cabinets having obstructions which prevent insertion of the complete unit in one piece.

It is further an object to provide an apparatus with flow control between various compartments. Some compartments may be used for a filtration methodology that requires a limited water level, or a limited flow rate, or constant submersion. A reliable mechanism for controlling flow, flow rate and water level between at least three adjoining compartments of such an apparatus is needed.

The invention is directed to overcoming one or more of the problems and solving one or more of the needs as set forth above.

SUMMARY OF THE INVENTION

To solve one or more of the problems set forth above, in an exemplary implementation of the invention, a multi-path aquarium filtration apparatus includes a housing, an ingress receptacle to receive water drawn from the aquarium, the ingress receptacle acting as a sound reducer, a first filter receptacle comprising one or more pass-through filters, a first chamber of sufficient size to retain a significant portion of water such that a protein skimmer treatment system or similar apparatus may be retained within the first chamber, a second chamber adapted to receive a reactor type treatment system, a third chamber adapted to receive varying types of treatment systems, such as for example a cascade system, a refugium system or a live rock system, a fourth chamber adapted to retain a sponge to polish the water flowing there through, and a fifth chamber adapted to retain a pump to deliver treated water back into the aquarium.

A bypass gate assembly is provided between the second chamber and the fourth chamber, the bypass gate member being adjustable such that a controlled and adjustable volume of water passes from the second chamber directly into the fourth chamber such that the volume of water passing from the second chamber into the third chamber may be increased or decreased. The third chamber is provided with bottom outflow openings which may be opened to allow discharge of water from the bottom of the third chamber into the fourth chamber or dosed such that water flows from the third chamber through an upper outflow opening into the fourth chamber.

In this manner, some of the water flows from the second chamber into the third chamber in a primary ingress flow path and the other portion of the water flows from the second chamber into the fourth chamber in a bypass flow path. As the third chamber is designed for receiving differing types of water treatment systems that require different flow volumes, the volume of water flow in the primary ingress flow path can be adjusted accordingly. Water flows from the third chamber into the fourth chamber in an upper primary exit flow path or a lower secondary exit flow path.

In a further embodiment of the multi-path aquarium filtration apparatus, the housing is provided in a modular or segmented structure, such that in the event a cabinet into which the multi-path aquarium filtration apparatus is to be placed has obstructions, such as a middle vertical column located in the cabinet opening, which precludes insertion and placement of the complete unit into the cabinet, the modules of the apparatus can be individually inserted into the cabinet and then joined by conduit fittings such that water is able to pass between the modules.

In a further embodiment a multi-path aquarium filtration system with flow management capability is provided. The system includes a tank with a plurality of separate chambers. Water flows from an outlet in one chamber into another chamber. In one exemplary embodiment, the tank includes at least three compartments, including first, second and third chambers. The second chamber retains a water treatment system (e.g., one or more chemical, optical or mechanical filters, a refugium or a protein skimmer). The second chamber receives water from the first chamber. The third chamber receives water from one of the first chamber and the second chamber. An adjustable bypass gate assembly is disposed between the first chamber and the second chamber. An overflow channel is disposed between the first chamber and the third chamber. The volume of water passing from the first chamber to the second chamber may be increased and decreased by adjusting the adjustable bypass gate assembly. The volume of the water passing from the first chamber to the third chamber may also be increased and decreased by adjusting the adjustable bypass gate assembly. Thus, the bypass gate assembly manages flow between three chambers. With gate fully opened, the overflow may be avoided. With the gate fully closed, flow will proceed primarily through the overflow. With the gate partially open, flow may proceed through both the gate and overflow according to the extent the gate is opened.

In an exemplary embodiment, the second chamber includes a second chamber outlet in fluid communication with the third chamber. The second chamber outlet may be a dam, with an aperture and a removable cover for the aperture, or an aperture in a wall, or an overflow channel in a wall, or an outlet from the multi-path aquarium filtration system.

Similarly, the third chamber may include a third chamber outlet, which may be in fluid communication with the second chamber or another chamber, or may be an outlet from the tank.

An aquarium may be fluidly coupled to the multi-compartment filter system by inlet piping and outlet piping. Water flows from the aquarium through the inlet piping into the multi-compartment filter system. Water flows from the multi-compartment filter system through the outlet piping into the aquarium.

BRIEF DESCRIPTION OF THE DRAWINGS

The foregoing and other aspects, objects, features and advantages of the invention will become better understood with reference to the following description, appended claims, and accompanying drawings, where:

Those skilled in the art will appreciate that the figures are not intended to be drawn to any particular scale; nor are the figures intended to illustrate every embodiment of the invention. The invention is not limited to the exemplary embodiments depicted in the figures or the specific components, configurations, shapes, relative sizes, ornamental aspects or proportions as shown in the figures.

DETAILED DESCRIPTION

Figure 1:
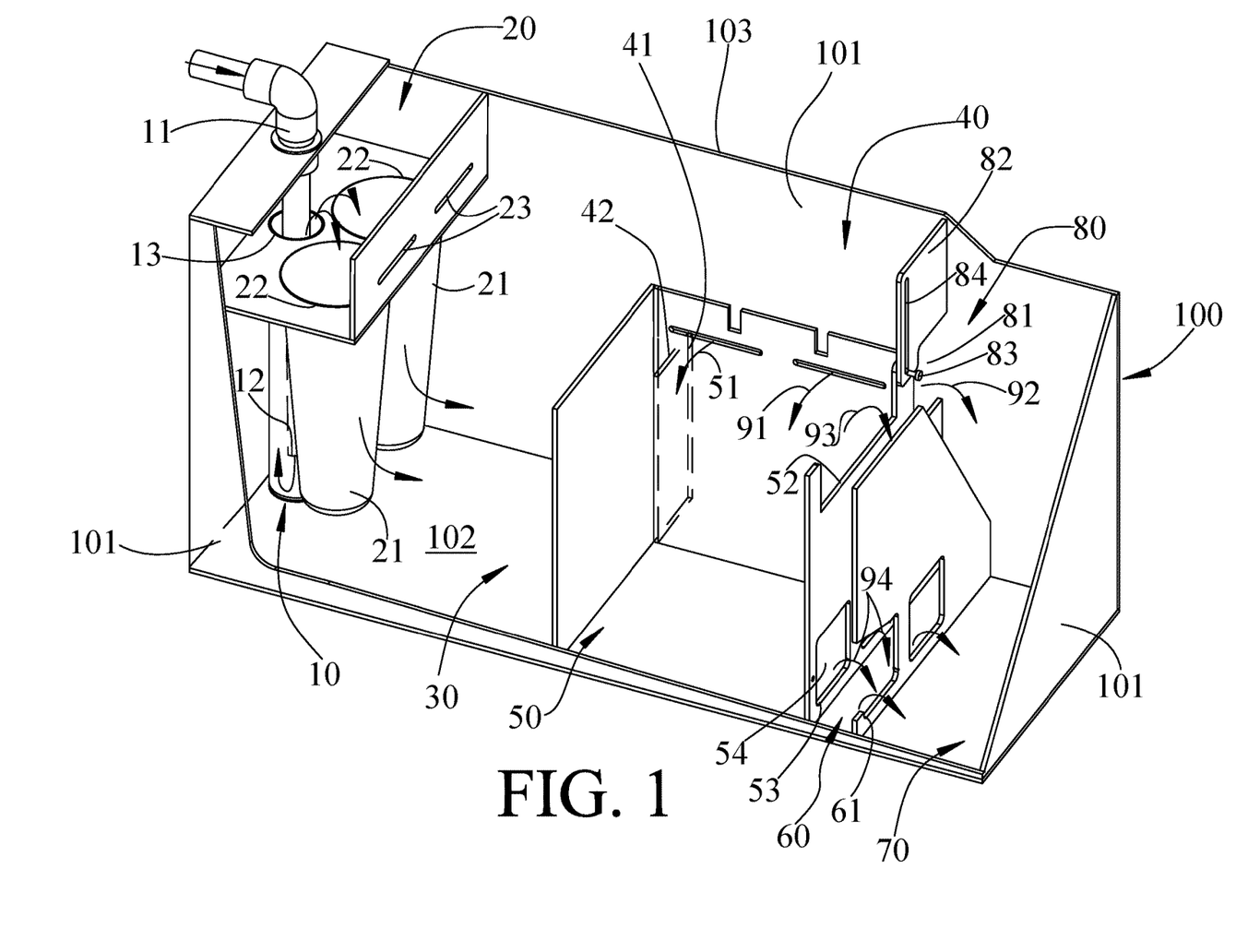
FIG. 1 is a representative illustration of an embodiment of the multi-path aquarium filter apparatus.

The invention in various embodiments is a multi-path aquarium filtration apparatus comprising a housing 100, an ingress receptacle 10 to receive water drawn from an aquarium, the ingress receptacle 10 acting as a sound or noise reducer, a first filter receptacle 20 comprising one or more pass through simple filters 21, such as sock filters, a first chamber 30 of sufficient size to retain a significant portion of water such that a protein skimmer treatment system or similar apparatus may be retained within the first chamber 30, a second chamber 40 adapted to receive a reactor type treatment system, a third chamber 50 adapted to receive varying types of treatment systems requiring differing flow volumes, such as for example a cascade system, a refugium system or a live rock system, a fourth chamber 60 adapted to retain a sponge to polish the water flowing therethrough to remove entrained air, and a fifth chamber 70 adapted to retain a pump to deliver treated water back into the aquarium.

The housing 100 is preferably a generally rectangular structure comprising four walls 101, a bottom 102 and an open top 103. Optionally, exterior perimeter bracing, known as euro-bracing, may be provided as structural reinforcement, without departing from the scope of the invention. A removable cover (not shown) is also provided. The walls 101 and bottom 102 form a watertight container and the open top 103 provides access to the interior of the housing 100. Preferably the housing 100 is composed of a transparent material such as an acrylic polymer or glass.

One or more inflow tubes 11 deliver water from an aquarium into the ingress receptacle 10, which comprises a chamber to receive the water from the inflow tubes. The ingress receptacle 10 comprises an open top 13 and inflow tubes 11 are provided with inflow openings 12, the inflow tubes 11 being inserted deeply into the ingress receptacle 10 (aka "bubble tubes") such that the inflow openings 12 are located near the bottom of the ingress receptacle 10. The ingress receptacle 10 may be tubular in shape as shown, or may also be configured as rectangular tubes or a single chamber for example. In this manner water flowing downward from the inflow tubes 11 is directed upward after exiting the inflow openings 12 so as to pass out through the open top 13 and into the first filter receptacle 20. With this structure, the ingress receptacle 10 acts as a noise reducer or silencer.

The first filter receptacle 20 directs the water through one or more simple filters 21, such as the sock filters illustrated, the sock filters 21 having open tops 22 whereby water passes through the sock filters 21 and into the first chamber 30. Overflow openings 23, which may comprise slots, holes or even a wall of reduced height relative to the height of the housing walls 101, provides an alternative flow path into the first chamber 30 in the event the water flow into the first filter receptacle 20 exceeds the pass-through flow of the sock filters 21.

In addition to or in lieu of sock filters 21, a tube containing filter media (e.g., sponge, open cell foam, activated carbon, synthetic or natural ion exchange media, absorbent synthetic polymers, and other absorbent and reactive media such as ferric oxide hydroxide-based media) and having a porous bottom may be utilized to remove particles from the water. Such a tube may have a flanged open top end. Supported by the flanges, tubes may extend through openings 22 (FIG. 4) in the receptacle 20. The tube may contain a single filter media or a plurality of filter media arranged in layers.

The first chamber 30 is a relatively large, open-topped chamber sized and adapted to receive a mechanical skimmer (not shown) for removing protein from the water delivered into the first chamber 30. The water level in the first chamber 30 is maintained at a minimum height as required by the protein skimmer by the combination of various wall members, primarily a wall of the third chamber 50.

Water then flows from the first chamber 30 into the second chamber 40. The open-topped second chamber 40 is sized and adapted to receive a reactor treatment system (not shown), such as a chemical bag or cartridge containing suspended particles to remove ammonia, phosphate or other contaminants from the water. The second chamber 40 may comprise an ingress wall 41 that defines a reactor chamber flow opening 42, which may comprise a slot or aperture in the wall 41 or which may be defined by the top of the ingress wall 41. Because of the volume of water retained within the first chamber 30, there is an elevated flow rate within the second chamber 40, which acts to suspend, agitate and move the particles of the reactor treatment system.

The third chamber 50 is disposed adjacent the second chamber 40, preferably along the long side of the second chamber 40, whereby water may flow from the open top of the second chamber 40 into the third chamber 50 on a primary ingress flow path 91 through ingress openings 51, which may comprise a reduced wall section, slots, apertures or the like positioned on the upper portion of the third chamber 50. The third chamber 50 is sized and adapted to receive differing types of treatment systems (not shown), such as for example a cascade system, a refugium system or a live rock system. For the refugium and the live rock systems, the third chamber 50 is provided with an upper outflow opening 52, which may comprise a reduced wall section, slots, apertures or the like positioned on the upper portion of the third chamber 50, such that water from the third chamber 50 flows into the fourth chamber 60 along a primary exit flow path 93. For a cascade system, which requires a low volume flow of water trickling down and across bioballs or the like, the third chamber 50 is provided with bottom outflow openings 53, disposed near the bottom of the third chamber 50, which may be opened by removing a dam member 54. With the bottom outflow openings 53 unblocked, water flows from the third chamber 50 into the fourth chamber 60 along lower secondary exit flow path 94.

A bypass gate assembly 80 (aka flow control gate) is positioned between the second chamber 40 and the fourth chamber 60, the bypass gate assembly comprising a bypass opening 81, which is partially or totally obstructed by an adjustable dam member 82. Dam member 82 may be raised or lowered by an opening control member 83 disposed within an opening control slot 84. With this structure, a portion of the water leaving the second chamber 40 may be directed past the third chamber 50 and into the fourth chamber along bypass flow path 92. The bypass gate assembly 80 is adjustable such that the amount of water passing from the second chamber 40 directly into the third chamber 50 may be increased or decreased. Increasing the open area of the bypass opening 81 allows more water to bypass the third chamber 50, thereby reducing the volume of water entering the third chamber 50. Decreasing the open area of the bypass opening 81 or closing it off completely increases the volume of water entering the third chamber 50.

In this manner, water flows from the second chamber 40 into the third chamber 50 along a primary ingress flow path 91 and water flows from the second chamber 40 into the fourth chamber 60 along a bypass flow path 92. Water flows from the third chamber 50 into the fourth chamber 60 along an upper primary exit flow path 93 or a lower secondary exit flow path 94, or potentially as a combination of both flow paths 93 and 94.

Fourth chamber 60 is sized and adapted to receive a polishing sponge or like member (not shown) that traps and removes entrained air bubbles from the water. The water then passes through outflow openings 61 in the wall 62 and into the fifth chamber 70. The fifth chamber 70 is sized and adapted to receive a water pump (not shown) for delivering the treated water back to the aquarium.

With this structure, the multi-path aquarium filtration apparatus is capable of receiving different combinations and types of water treatment systems as required. The water flow paths and the water flow volume can be adjusted as required dependent upon the particular treatment systems disposed within the third chamber 50. Thus, the multi-path aquarium filtration apparatus provides a filtration system adaptable and customizable to many different aquarium environments.

In many circumstances the multi-path aquarium filtration apparatus will be retained within a cabinet, the cabinet usually having an opening covered by one or two hinged doors. In certain cabinets, a centrally located vertical obstruction is present, such that a pair of smaller openings are provided in the cabinet rather than a single large one. This structure sometimes prevents insertion of the multi-path aquarium filtration apparatus as shown in FIG. 1.

Figure 2:
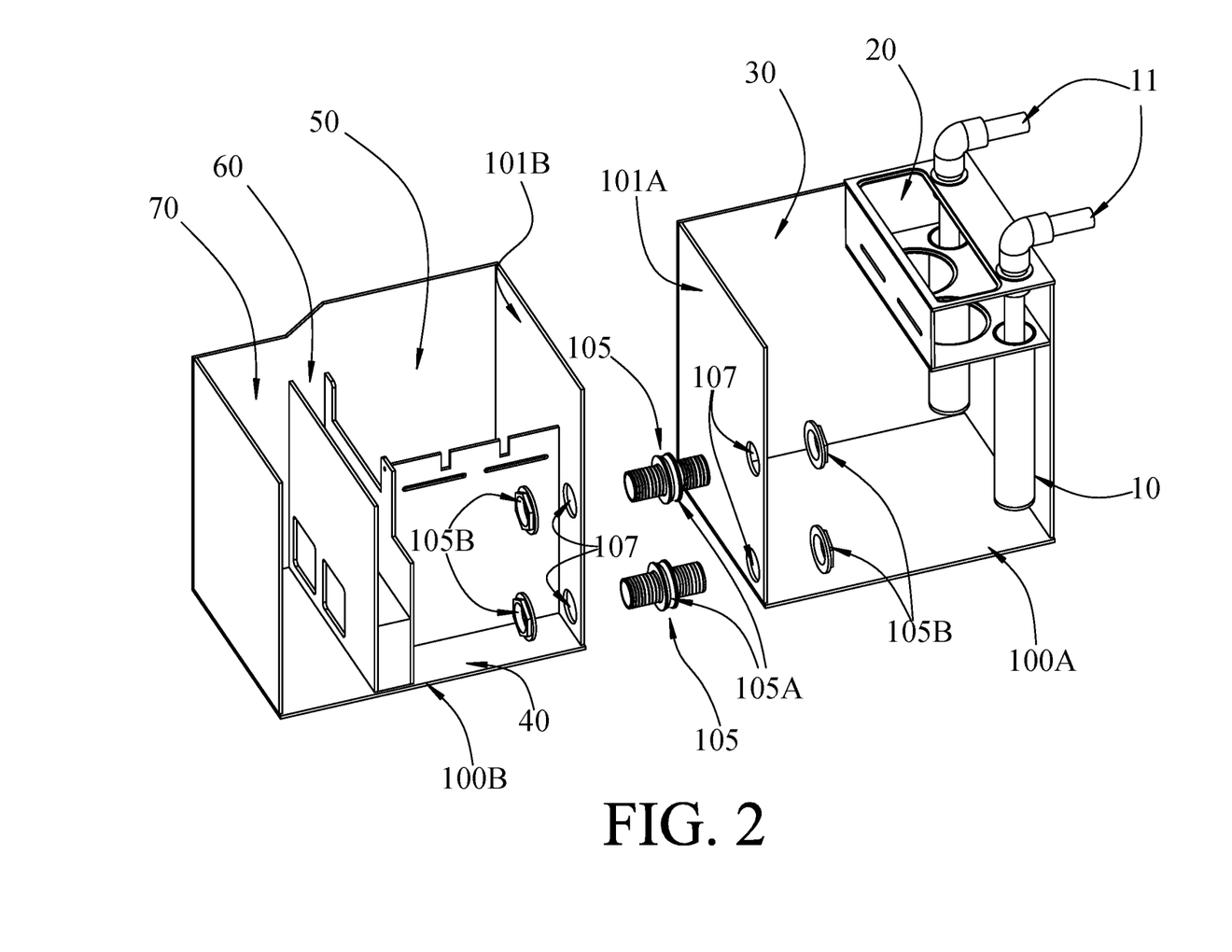
FIG. 2 is a representative illustration of an alternative embodiment of the multi-path aquarium filter apparatus in modular form, with components, such as the adjustable gate, removed for clarity.

Therefore, in an alternative embodiment of the multipath aquarium filtration apparatus, as shown in FIG. 2, the apparatus is provided in modular or segmented form, The housing 100 is produced in two separate modules 100A and 100B which can be joined in a fluid communicating manner. Module 100A comprises the ingress receptacle 10, the first filter receptacle 20 and the first chamber 30. A fourth wall 101A is present, the fourth wall 101A becoming an interior wall when the modules 100A and 100B are joined. Module 100B comprises the second chamber 40, the third chamber 50, the fourth chamber 60 and the fifth chamber 70. Module 100B also is provided a fourth wall 101B.

The fourth walls 101A and 101B are each provided with a fitting opening 107, the fitting openings 107 being aligned coaxially when the modules 100A and 100B are joined. A conduit fitting 105 is provided of a type that secures the two modules 100A and 100B together while simultaneously providing a fluid passageway from module 100A into module 100B. As shown, the conduit fitting 105, often called a bulkhead fitting, may comprise a central member 105A having a pair of threaded tubes extending from a central flange, such that a bore extends completely through the central member 105A. With the central member 105A inserted into the fitting openings 107, a threaded nut 105B is mounted onto each of the tubes of the central member 105A and tightened to secure the modules 100A and 100B tightly together. Water is then able to pass from the first chamber 30 into the second chamber 40. The conduit fitting 105 may also comprise tubing or piping, rigid or flexible, through the walls or over the walls.

Figure 3:
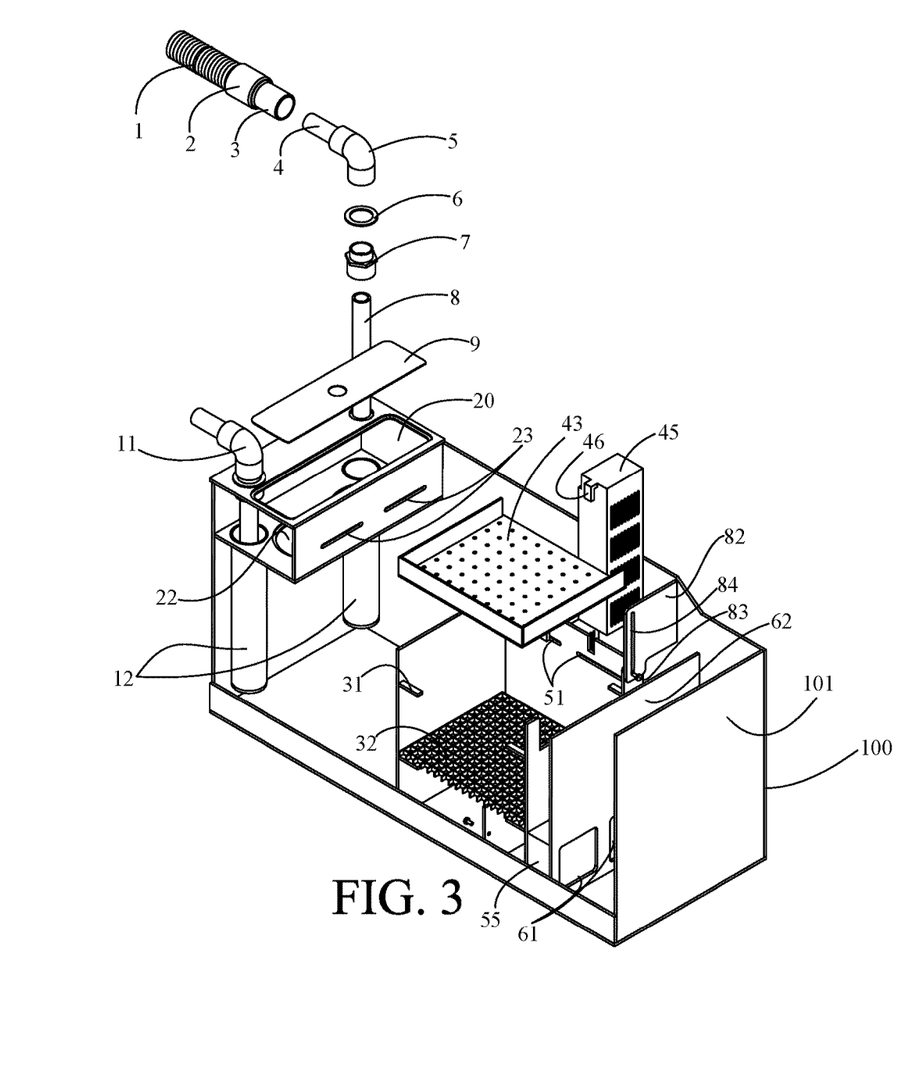
FIG. 3 is a representative illustration of an embodiment of a multi-path aquarium filter apparatus according to principles of the invention, with a refugium compartment, a filter and a flow control gate in a raised position.

Water from an aquarium flows into the filtration apparatus of FIG. 3 through pipes or hoses and couplings. An exemplary inlet may include a threaded end 1, and a coupling with a threaded end 2 and an unthreaded end 3, a slip fitting 4, an elbow 5 with one slip fitting 4 and a threaded end, a washer 6, a threaded coupling 7 and a vertical pipe 8. A removable cover 9 protects receptacle 20. The threaded portion of coupling 7 is inserted through an opening (96 or 97, FIG. 4) from the inside of receptacle 20. Washer 6 is applied over the threaded portion of coupling 7 from the outside of the receptacle 20. Then threaded elbow 5 is screwed onto the threaded portion of the coupling 7. A similar arrangement of elements may couple inlet 11 to an aquarium.

Optionally, a drip tray 43 may be installed to drip water onto plants, rocks and/or biomedia that do not tolerate constant submersion and/or require a moderate flow rate.

The drip tray 43 is a perforated tray (i.e., a tray with a plurality of holes through which water may drip). The tray 43 abuts a wall of a compartment at a height even with or slightly below ingress openings 51. The tray 43 may be supported by bonding or mechanical supports, such as shelf pins 31.

Also optionally, a porous shelf 32 may be positioned beneath the drip tray 43, above the bottom of the compartment, with sufficient space between the bottom of the drip tray 43 and top of the shelf 32 to accommodate the matter to be irrigated with dripping water from the tray 43. The matter may be plants, rocks, biomedia (e.g., bio-balls) or other suitable filtration substances that do not require or cannot tolerate submersion. The shelf 32 may be supported by bonding or mechanical supports, such as shelf pins 31.

In FIG. 3, a chemical media cartridge 45 is shown. The cartridge 45 includes an outer housing that contains chemical media. Apertures in the housing allow flow through the housing and the contained chemical media. A hook 46 extends from the housing for mounting to a wall of a compartment, such as in either of notches 33. Water (i.e., aquarium water to be filtered) that does not flow through the refugium (third) compartment 50 for filtration, flows through the chemical media cartridge 45 before passing through bypass gate assembly 80. The chemical media cartridge 45 contains chemical filter media removes pollutants and other dissolved waste materials through chemical reactions, to maintain high water quality for an extended period of time. The chemical media may, by way of example, comprise activated carbon, synthetic or natural ion exchange media (e.g., zeolite), absorbent synthetic polymers, and other absorbent and reactive media such as ferric oxide hydroxide-based media.

One or more mechanical filters 55 are disposed between the outlet compartment 70 and the upstream compartments 30, 40, 50. In the exemplary embodiment shown in FIG. 3, a single filter 55 is disposed in the fourth compartment 60, abutting the outflow openings 61. All water must pass through each mechanical filter 55 to flow through the outflow opening 61. By way of example and not limitation, the mechanical filters may comprise an open-cell foam with 5 to 100 pores per inch.

Figure 4:
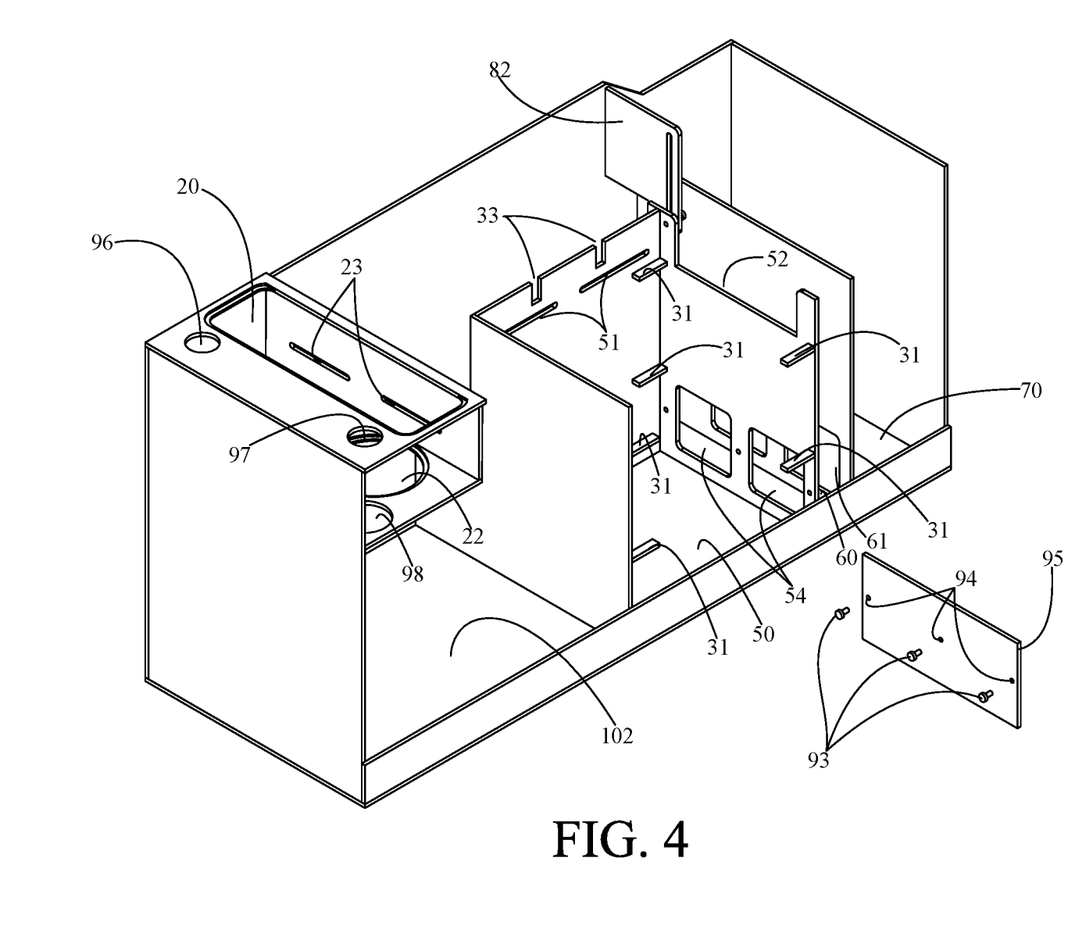
FIG. 4 is another representative illustration of an embodiment of a multi-path aquarium filter apparatus according to principles of the invention, with a flow control gate in a raised position, an overflow weir, an open dam and shelf supports for refugium platforms.
Figure 5:
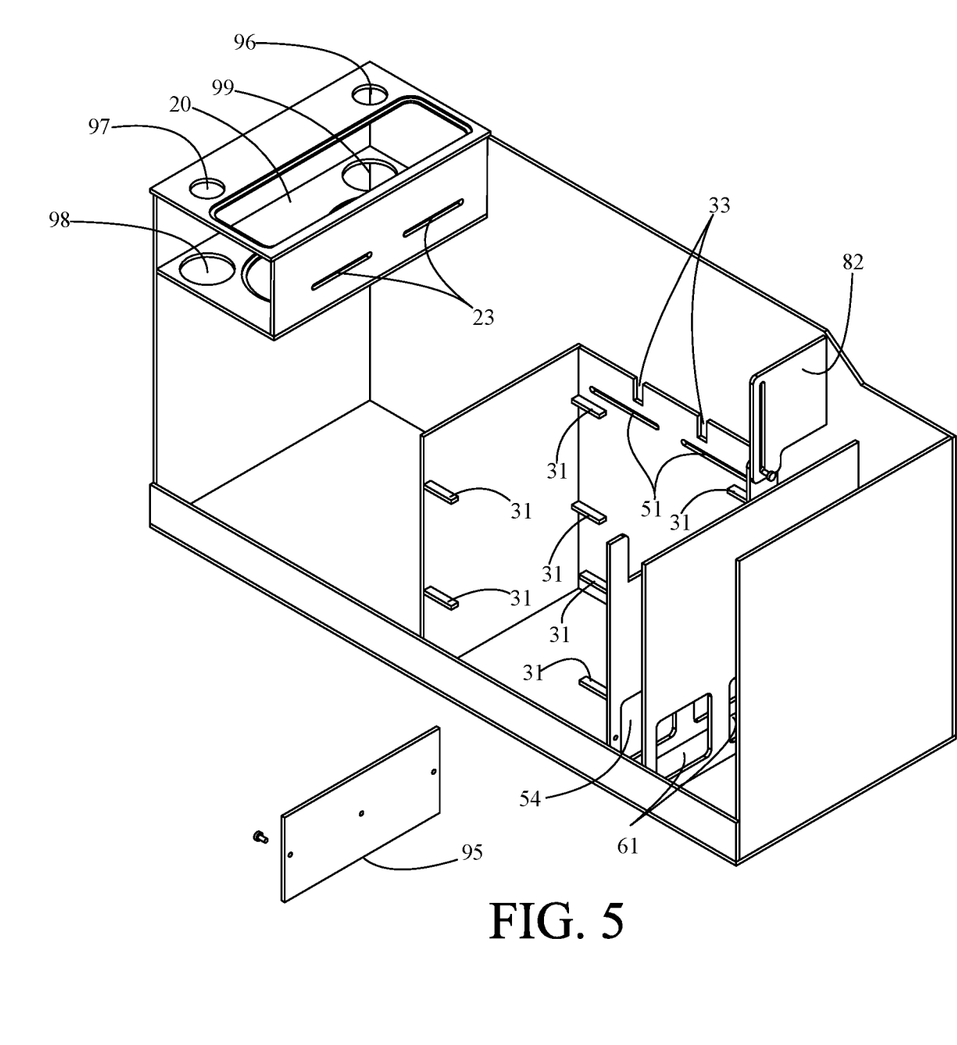
FIG. 5 is another perspective view of the embodiment of the multi-path aquarium filter apparatus of FIG. 4, with a flow control gate in a raised position, an overflow weir, an open dam and shelf supports for refugium platforms.

FIGS. 4 and 5 illustrate the apparatus of FIG. 3 without the drip tray 43, shelf 32, foam filter 55, chemical filter 45, inlet piping 1-8, 11, cover 9, inflow tubes 11, and ingress receptacle 10. Apertures 96, 97 are provided for receiving inflow tubes 11. Apertures 98, 99 are provided for ingress receptacles 10.

Screws or pegs 93 extend through mounting apertures 94 in panel 95, to selectively cover or expose dam openings 54. Thus, the openings 54 in the dam may be covered or opened. When covered, water accumulates in the compartment 50 until it overflows through an overflow port (weir) 52. When uncovered, water flows through the dam openings 54.

Notches 33 are provided at the top edge of the back wall of compartment 50. The notches 33 engage the mounting hook 46 of the chemical filter 45. A plurality of notches 33 accommodate one or more chemical filters. In the case of a plurality of chemical filters 45, they are arranged in series.

A multi-compartment filtration apparatus according to principles of the invention includes at least 3 compartments, a flow control gate between at least two compartments (e.g., a first compartment and a second compartment), and an alternative flow path that fluidly couples the first compartment to the third compartment. If the gate is fully open, the gate will be the primary flow path. If the gate is fully closed, the alternative flow path will be the primary flow path. If the gate is partially open, flow may proceed through both the gate and the alternative flow path at equal or different volumetric flow rates.

Figure 6:
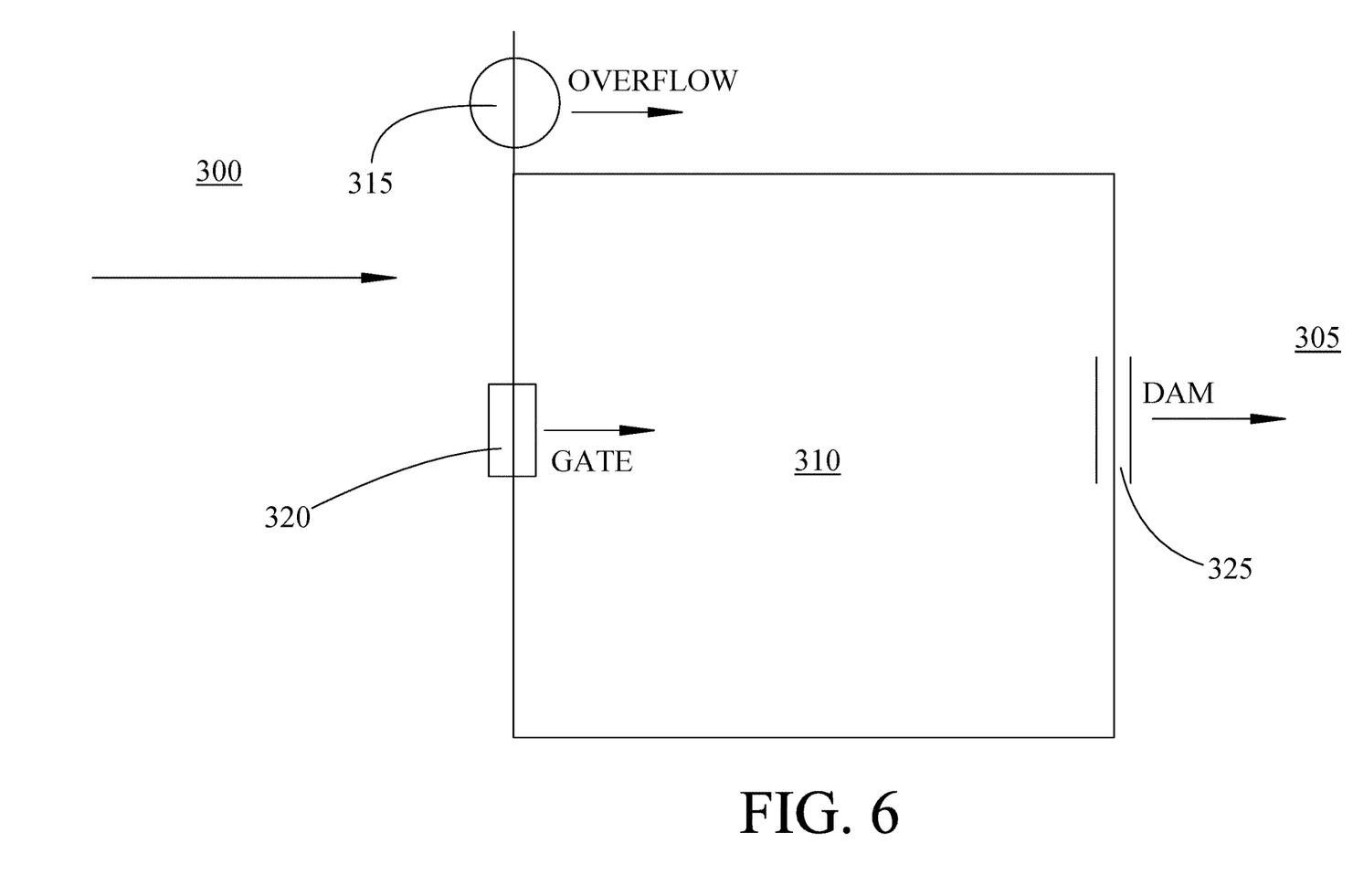
FIG. 6 is a schematic that conceptually illustrates flow control between a plurality of compartments using a flow control gate, an overflow weir and a dam according to principles of the invention.

Illustratively, in the schematic of FIG. 6, water flows from compartment 300, through gate 320 and/or through overflow 315. Flow through gate 320 leads to compartment 310. Flow through overflow 315 leads to compartment 305. A dam 325 is provided along a wall between compartment 310 and compartment 305. When flow proceeds through compartment 310, dam 325 may be opened to allow outflow from compartment 310 to compartment 305.

Figure 7:
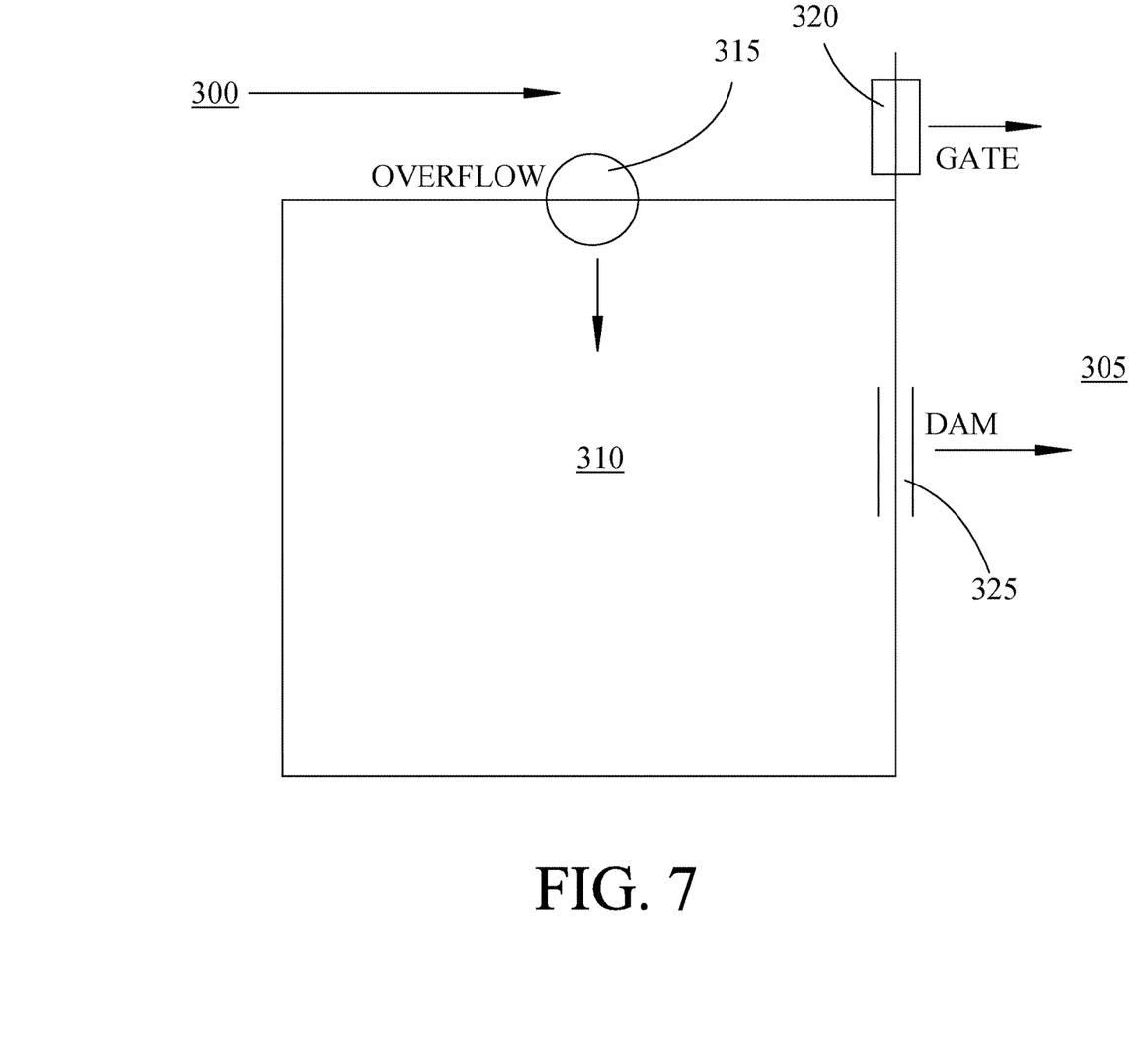
FIG. 7 is a schematic that conceptually illustrates flow control between a plurality of compartments using a flow control gate, an overflow weir and a dam according to principles of the invention.

As another example, in the schematic of FIG. 7, water flows from compartment 300, through gate 320 and/or through overflow 315. Flow through gate 320 leads to compartment 305. Flow through overflow 315 leads to compartment 310. A dam 325 is provided along a wall between compartment 310 and compartment 305. When flow proceeds through compartment 310, dam 325 may be opened to allow outflow from compartment 310 to compartment 305.

In each schematic of FIGS. 6 and 7, a gate 320 and an alternative flow path (e.g., overflow 315) are provided in one compartment. Additionally, each of the gate 320 and the alternative flow path 315, lead to different compartments. Every compartment includes an inlet and an outlet. The inlet may be inlet piping 11 or an opening or pathway from an abutting compartment. The outlet may be a pump fluidly coupled to return piping leading to the aquarium, or an opening or pathway to an abutting compartment. For simplicity and clarity, the inlet of compartment 300 is not shown and the outlet of compartment 305 is not shown.

An apparatus according to principles of the invention is scalable. It may contain three or more compartments, with one or more gates. An alternative flow path may comprise a dam, an overflow opening or weir, an aperture at the bottom of a wall, a plurality of apertures in a wall, or a gate.

Figure 8:
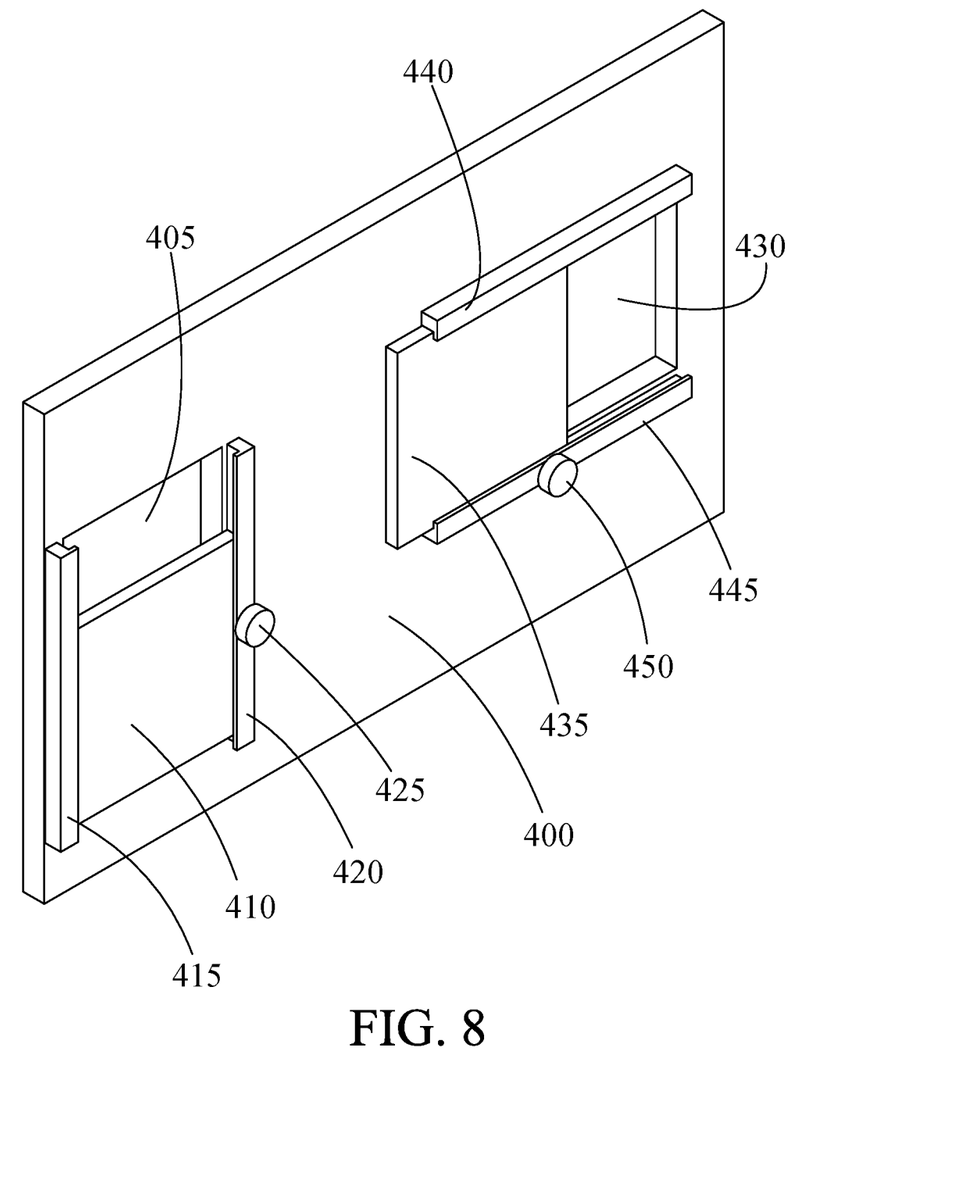
FIG. 8 conceptually illustrates alternative bypass gate assemblies according to principles of the invention.

FIG. 8 illustrates alternative embodiments of gates (i.e., adjustable bypass gate assemblies). Each gate embodiment includes an aperture 405, 430 in a wall 400, with a sliding panel 410, 435 sized and shaped to cover the aperture 405, 430. Each panel 410, 435 slides between a pair of parallel L-shaped tracks 415, 420 and 440, 445 on opposite sides of the aperture 405, 430. Optionally, a thumb screw 425, 450 threads into a threaded aperture in a track 420, 445, to press against an edge of the panel 410, 435, thereby locking the panel in a position relative to the tracks 415, 420 and 440, 445. In one embodiment, the panel 410 slides vertically. In another, the panel 435 slides horizontally. However, the invention is not limited to a particular direction of sliding motion, whether vertical, horizontal or askew. In each embodiment, the portion, if any, of the aperture 405, 430 covered by the panel 410, 435 can be varied by sliding the panel 410, 435 relative to the aperture 405, 430. Mechanisms that enable sliding adjustment of the panel 410, 435 relative to the aperture 405, 430, other than tracks 415, 420 and 440, 445 may be utilized, as, for example shown in FIGS. 1, 3-5. Additionally, means for locking the panel 410, 435 in place, other than a thumb screw 425, 450, may be utilized. By way of example and not limitation, the panel 410, 435 may snugly fit between the opposed pairs of tracks 415, 420 and 440, 445.

In another alternative embodiment, the gate assembly may comprise an aperture in a wall, a panel that can pivot along a continuum of angular positions, from an angular position in which the panel covers the aperture, to an angular position in which the panel fully exposes the aperture.

In all bypass gate assembly embodiments the aperture may be an aperture in a wall between the top edge and bottom edge of the wall, or an aperture (e.g., a channel) at the top edge, or an aperture (e.g., a channel) at the bottom edge. The aperture may extend for a portion of the wall between the sides. Alternatively, the aperture may extend across the entire wall from side to side.

In sum, a multi-path aquarium filtration system with flow management capability is provided. The system includes a tank with a plurality of separate chambers. Water flows from an outlet in one chamber into another chamber. In one exemplary embodiment, the tank includes at least three compartments, i.e., at least first, second and third chambers. The second chamber retains a water treatment system (e.g., one or more chemical, optical or mechanical filters, a refugium or a protein skimmer). The second chamber receives water from the first chamber. The third chamber receives water from one of the first chamber and the second chamber. An adjustable bypass gate assembly is disposed between the first chamber and the second chamber. An overflow channel is disposed between the first chamber and the third chamber.

The volume of water passing from the first chamber to the second chamber may be increased and decreased by adjusting the adjustable bypass gate assembly. The volume of the water passing from the first chamber to the third chamber may also be increased and decreased by adjusting the adjustable bypass gate assembly. The bypass gate assembly is adjustable over a continuum of positions, from fully open to fully closed. When fully closed, flow through the bypass gate assembly is substantially prevented. When fully opened, flow through the bypass gate assembly is substantially unimpeded. Thus, the bypass gate assembly manages flow between three chambers. With gate fully opened, the overflow may be avoided. With the gate fully closed, flow will proceed primarily through the overflow. With the gate partially open, flow may proceed through both the gate and overflow according to the extent the gate is opened.

In an exemplary embodiment, the second chamber includes a second chamber outlet in fluid communication with the third chamber. The second chamber outlet may be a dam, with an aperture and a removable cover for the aperture, or an aperture in a wall, or an overflow channel in a wall, or an outlet from the multi-path aquarium filtration system.

Similarly, the third chamber may include a third chamber outlet, which may be in fluid communication with the second chamber or another chamber, or may be an outlet from the tank.

An aquarium may be fluidly coupled to the multi-compartment filter system by inlet piping and outlet piping. Water flows from the aquarium through the inlet piping into the multi-compartment filter system. Water flows from the multi-compartment filter system through the outlet piping into the aquarium.

While an exemplary embodiment of the invention has been described, it should be apparent that modifications and variations thereto are possible, all of which fall within the true spirit and scope of the invention. With respect to the above description then, it is to be realized that the optimum relationships for the components and steps of the invention, including variations in order, form, content, function and manner of operation, are deemed readily apparent and obvious to one skilled in the art, and all equivalent relationships to those illustrated in the drawings and described in the specification are intended to be encompassed by the present invention. The above description and drawings are illustrative of modifications that can be made without departing from the present invention, the scope of which is to be limited only by the following claims. Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents are intended to fall within the scope of the invention as claimed.

What is claimed is:

1. A multi-path aquarium filtration system comprising:
   a first chamber adapted to retain water;
   a second chamber adapted to retain a water treatment system, the second chamber receiving the water from the first chamber;
   a third chamber, the third chamber receiving the water from one of the first chamber and the second chamber;
   an adjustable bypass gate assembly disposed between the first chamber and the second chamber, and an overflow channel disposed between the first chamber and the third chamber;
   whereby the volume of the water passing from the first chamber to the second chamber may be increased and decreased by adjusting the adjustable bypass gate assembly, and the volume of the water passing from the first chamber to the third chamber may be increased and decreased by adjusting the adjustable bypass gate assembly, thereby controlling flow through the overflow channel.

2. The system of claim 1, wherein the second chamber includes a second chamber outlet in fluid communication with the third chamber.

3. The system of claim 2, wherein the second chamber outlet comprises a dam, the dam including an aperture and a removable cover for the aperture.

4. The system of claim 2, wherein the second chamber outlet comprises an aperture in a wall, the wall being disposed between the second chamber and third chamber.

5. The system of claim 2, wherein the second chamber outlet comprises an overflow channel in a wall, the wall having a top edge and being disposed between the second chamber and third chamber and the overflow channel being at the top edge.

6. The system of claim 2, wherein the third chamber includes an outlet from the multi-path aquarium filtration system.

7. The system of claim 1, wherein the second chamber includes a second chamber outlet and third chamber includes a third chamber outlet, the third chamber outlet being in fluid communication with the second chamber.

8. The system of claim 7, wherein the second chamber outlet comprises a dam, the dam including an aperture and a removable cover for the aperture.

9. The system of claim 7, wherein the second chamber outlet comprises an aperture in a wall, the wall being disposed between the second chamber and third chamber.

10. The system of claim 7, wherein the second chamber outlet comprises an overflow channel in a wall, the wall having a top edge and being disposed between the second chamber and third chamber and the overflow channel being at the top edge.

11. The system of claim 7, wherein the second chamber outlet comprises an outlet from the multi-path aquarium filtration system.

12. The system of claim 1, wherein the second chamber includes a bottom and a porous tray, the porous tray being parallel to the bottom and displaced above the bottom.

13. The system of claim 1, wherein the third chamber includes a porous filter.

14. A multi-path aquarium filtration system comprising:
an aquarium fluidly coupled to a multi-compartment filter system by an inlet piping and an outlet piping, water flowing from the aquarium through the inlet piping into the multi-compartment filter system, and water flowing from the multi-compartment filter system through the outlet piping into the aquarium, and
the multi-compartment filter system comprising
a first chamber;
a second chamber adapted to retain a water treatment system, the second chamber receiving the water from the first chamber;
a third chamber, the third chamber receiving the water from one of the first chamber and the second chamber;
an adjustable bypass gate assembly disposed between the first chamber and the second chamber, and an overflow channel disposed between the first chamber and the third chamber;
whereby the volume of the water passing from the first chamber to the second chamber may be increased and decreased by adjusting the adjustable bypass gate assembly, and the volume of the water passing from the first chamber to the third chamber may be increased and decreased by adjusting the adjustable bypass gate assembly, thereby controlling flow through the overflow channel.

15. The system of claim 14, wherein the second chamber includes a second chamber outlet in fluid communication with the third chamber.

16. The system of claim 15, wherein the second chamber outlet comprises a dam, the dam including an aperture and a removable cover for the aperture.

17. The system of claim 15, wherein the second chamber outlet comprises an aperture in a wall, the wall being disposed between the second chamber and third chamber.

18. The system of claim 15, wherein the second chamber outlet comprises an overflow channel in a wall, the wall having a top edge and being disposed between the second chamber and third chamber and the overflow channel being at the top edge.

19. The system of claim 15, wherein the third chamber includes an outlet from the multi-path aquarium filtration system.

20. The system of claim 14, wherein the second chamber includes a second chamber outlet and third chamber includes a third chamber outlet, the third chamber outlet being in fluid communication with the second chamber.

* * * * *